(12) United States Patent
Takase et al.

(10) Patent No.: US 7,367,762 B2
(45) Date of Patent: May 6, 2008

(54) MAIN SPINDLE APPARATUS AND TOOL HOLDER CLAMP UNIT USED THEREFOR

(75) Inventors: Akira Takase, Toyama (JP); Hisao Sasaki, Toyama (JP)

(73) Assignee: Nippei Toyama Corporation, Tokyo (JP)

(*) Notice: Subject to any disclaimer, the term of this patent is extended or adjusted under 35 U.S.C. 154(b) by 180 days.

(21) Appl. No.: 11/094,360

(22) Filed: Mar. 31, 2005

(65) Prior Publication Data

US 2005/0220556 A1  Oct. 6, 2005

(30) Foreign Application Priority Data

Mar. 31, 2004 (JP) ............... P.2004-108347
Feb. 21, 2005 (JP) ............... P.2005-044657

(51) Int. Cl.
*B23C 1/00* (2006.01)
*B23C 5/28* (2006.01)

(52) U.S. Cl. ............ 409/233; 409/136; 408/239 R

(58) Field of Classification Search ............. 409/135, 409/136, 231–233; 408/239 R
See application file for complete search history.

(56) References Cited

U.S. PATENT DOCUMENTS

| | | | | |
|---|---|---|---|---|
| 4,436,464 A | * | 3/1984 | Seiberlich | 409/233 |
| 4,957,398 A | * | 9/1990 | Schneider et al. | 409/136 |
| 5,039,261 A | * | 8/1991 | Takada | 409/136 |
| 5,096,347 A | * | 3/1992 | Kumagai et al. | 409/233 |
| 5,238,341 A | * | 8/1993 | Horsch | 409/233 |
| 5,327,979 A | * | 7/1994 | Du et al. | 173/74 |
| 5,639,194 A | * | 6/1997 | Harroun | 409/233 |
| 5,660,510 A | * | 8/1997 | Taniguchi et al. | 409/136 |
| 5,782,586 A | * | 7/1998 | Geissler | 408/56 |
| 5,860,776 A | * | 1/1999 | Sato et al. | 409/233 |
| 6,036,416 A | * | 3/2000 | Yeh | 409/233 |
| 6,079,919 A | * | 6/2000 | Zosi | 409/233 |
| 6,174,115 B1 | * | 1/2001 | Hashidate et al. | 409/231 |
| 6,287,059 B1 | * | 9/2001 | Hashidate et al. | 409/233 |
| 6,398,468 B1 | * | 6/2002 | Bayer et al. | 409/135 |
| 6,473,951 B1 | | 11/2002 | Nakaminami et al. | |

FOREIGN PATENT DOCUMENTS

JP  1-135403 A  5/1989

OTHER PUBLICATIONS

Patent Abstracts of Japan, Publication No. 2004-322306, Publication Date: Nov. 18, 2004.

(Continued)

*Primary Examiner*—Monica S. Carter
*Assistant Examiner*—Eric A. Gates
(74) *Attorney, Agent, or Firm*—Sughrue Mion, PLLC

(57) ABSTRACT

A main spindle apparatus has a main spindle having a through hole, a main spindle head rotatably supporting the main spindle therein, a tool holder clamp unit including an unit main body having a tool mounting hole to which a tool holder is mounted, a clamp mechanism for clamping the tool holder and a bias mechanism for biasing the clamp mechanism in a clamping state and a clamp release mechanism provided on the main spindle head side and releasing the clamping state of the clamp mechanism by operating the bias mechanism, wherein the tool holder clamp unit is mounted on the though hole of the main spindle so that the tool holder clamp unit is detachable from front side of the main spindle.

17 Claims, 8 Drawing Sheets

OTHER PUBLICATIONS

Patent Abstracts of Japan, Publication No. 07-112303, Publication Date: May 2, 1995.
Patent Abstracts of Japan, Publication No. 2000-094203, Publication Date: Apr. 4, 2000.
Patent Abstracts of Japan, Publication No. 2003-159622, Publication Date: Jun. 3, 2003.
Patent Abstracts of Japan, Publication No. 03-213202, Publication Date: Sep. 18, 1991.

* cited by examiner

MAIN SPINDLE APPARATUS AND TOOL HOLDER CLAMP UNIT USED THEREFOR

The present invention claims foreign priority to Japanese patent application no. P.2004-108347, filed on Mar. 31, 2004 and P.2005-44657, filed on Feb. 21, 2005, the contents of which are incorporated herein by reference.

BACKGROUND OF THE INVENTION

1. Field of the Invention

The present invention relates to a main spindle apparatus of a machine tool for working various works and a tool holder clamp unit used therefor.

2. Description of the Related Art

Generally, a main spindle apparatus of a machine tool rotatably supports a main spindle at an inner portion of a main spindle head and mounts a clamp mechanism for clamping a tool holder at a front end portion of the main spindle. A drawing bar for operating to clamp or unclamp the clamp mechanism is contained in a through hole of the main spindle, and a disc spring for biasing the drawing bar in a direction of clamping the tool holder is interposed between a spring receiving member integrally formed at an outer peripheral face of a middle portion of the drawing bar and a stepped portion formed at an inner peripheral face of the through hole of the main spindle in a laminated state. Further, a state of clamping the tool holder by the clamp mechanism is released by moving the drawing bar to a front side in an axial direction against a bias force of the disc spring by a clamp release mechanism provided on the main spindle head side as described in Japanese Patent Unexamined Publication JP-A-1-135403.

However, according to the conventional main spindle apparatus of the machine tool, a front end face of the disc spring is locked by the stepped portion on a side of the main spindle. Therefore, when maintenance, check or repair of failure of a bias mechanism including the clamp mechanism and the disc spring or the like is carried out, the bias mechanism needs to remove from a rear portion of the main spindle and a problem that the operation is very troublesome is occurred.

SUMMARY OF THE INVENTION

It is an object of the invention to resolve the above-mentioned problem and provide a main spindle apparatus of a machine tool capable of easily removing a tool holder clamp unit having a clamp mechanism and an bias mechanism from a front side of a main spindle and promoting operability of maintenance.

Further, it is one of another object of the invention to provide a tool holder clamp unit used for a main spindle apparatus of a machine tool capable of being removed easily from a main spindle.

In order to resolve the above-described problem, according to a first aspect of the present invention, there is provided a main spindle apparatus, comprising:

a main spindle having a through hole in an axial direction thereof;

a main spindle head rotatably supporting the main spindle therein;

a tool holder clamp unit including:

an unit main body having a tool mounting hole to which a tool holder is mounted;

a clamp mechanism for clamping the tool holder; and a bias mechanism for biasing the clamp mechanism in a clamping state; and a clamp release mechanism provided on the main spindle head side, the clamp release mechanism releasing the clamping state of the clamp mechanism by operating the bias mechanism, wherein the tool holder clamp unit is mounted on the though hole of the main spindle so that the tool holder clamp unit is removal from front side of the main spindle.

According to a second aspect of the present invention as set forth in the first aspect of the present invention, it is preferable that the unit main body of the tool holder clamp unit is substantially tube shaped, the clamp mechanism is provided interior of the unit main body and the biasing mechanism is provided at a rear end of the unit main body.

According to a third aspect of the present invention as set forth in the second aspect of the present invention, it is more preferable that the clamping mechanism comprises:

a slider provided in the unit main body, the slider reciprocatably slides within a predetermined stroke range in an axial direction; and a plurality of clamp members connected on a front end portion of the slider, wherein the bias mechanism comprises:

a drawing bar connected to a rear end portion of the slider;

a first spring receiving member provided at a rear end portion of the drawing bar;

a second spring receiving member provided at a rear end portion of the unit main body, and a bias member provided between the first spring receiving member and second spring receiving member, the bias member biasing the drawing bar to a clamp position.

According to a fourth aspect of the present invention as set forth in the first aspect of the present invention, it is further preferable that the front end portion of the unit main body is integrally formed with a flange portion, and the flange portion is attached to a front end face of the main spindle by a bolt.

According to a fifth aspect of the present invention as set forth in the third aspect of the present invention, it is furthermore preferable that radially center portions of the clamp mechanism and the drawing bar are formed with coolant paths for supplying a coolant to a center portion of the tool holder.

According to a sixth aspect of the present invention as set forth in the first aspect of the present invention, it is suitable that the bias member is a disc spring or a coil spring.

According to a seventh aspect of the present invention, as set forth in the first aspect of the present invention, it is more suitable that the through hole of the main spindle is formed such that diameter of the through hole is stepwisely reduced from a front end of the main spindle apparatus to a rear end of the spindle apparatus.

According to an eighth aspect of the present invention, there is provided a tool holder clamp unit mounted to a machining apparatus, comprising:

a tool mounting hole which mounts a tool holder at tip end portion thereof;

an unit main body being in substantially tube shaped;

a clamp mechanism clamping the tool holder and provided in the unit main body; and a bias mechanism provided at a rear end portion of the unit main body and biasing the clamp mechanism in a clamp state, wherein the tool holder clamp unit is removal from a front side of the machining apparatus.

According to a ninth aspect of the present invention as set forth in the third aspect of the present invention, it is preferable that the clamp release mechanism comprises:

an operating member provided in the through hole of the main spindle so as to contact with a rear end portion of the first spring receiving member and so as to reciprocate in the axial direction, the operating member having protrusion which protrudes in a radial direction; and a piston reciprocating in the axial direction so as to contact with the protrusion of the operating member, wherein the piston presses the protrusion forwardly in order to release the clamp state of the tool holder.

According to a tenth aspect of the present invention, it is more preferable that the bias mechanism biases the drawing bar rearwardly in order to set the clamp mechanism in the clamp state.

According to the present invention, the unit main body provided with the tool mount hole for mounting the tool holder at the tip end portion thereof, the tool holder clamp unit mounted with the clamp mechanism of the tool holder and the bias mechanism for maintaining the clamp mechanism in the clamp state is mounted to the through hole of the main spindle removably from the front side of the main spindle. Therefore, by attaching and detaching the total of the tool holder clamp unit, which includes the clamp mechanism and the biasing mechanism, from the front side of the main spindle in the through hole of the main spindle. Also, when the tool holder clamp unit is taken out, it is easy to define condition or failure of the bias mechanism by its appearance. Accordingly, maintenance or repair can be easily conducted.

Further, according to the present invention, the total of the bias mechanism is mounted to the side of the clamp unit and therefore, a stepped portion in a flange-like shape for locking the front end face of the bias member may not be provided at a middle of an inner peripheral face of the through hole of the main spindle. Since, the throughhole of the main spindle can be worked only from one side in an axial direction, efficiency of working operation can be promoted and a reduction in cost can be achieved.

DETAILED DESCRIPTION OF THE PREFERRED EMBODIMENTS

An explanation will be given of an embodiment of a main spindle apparatus used for a machine tool embodying the present invention in reference to the drawings as follows.

Figure 1:
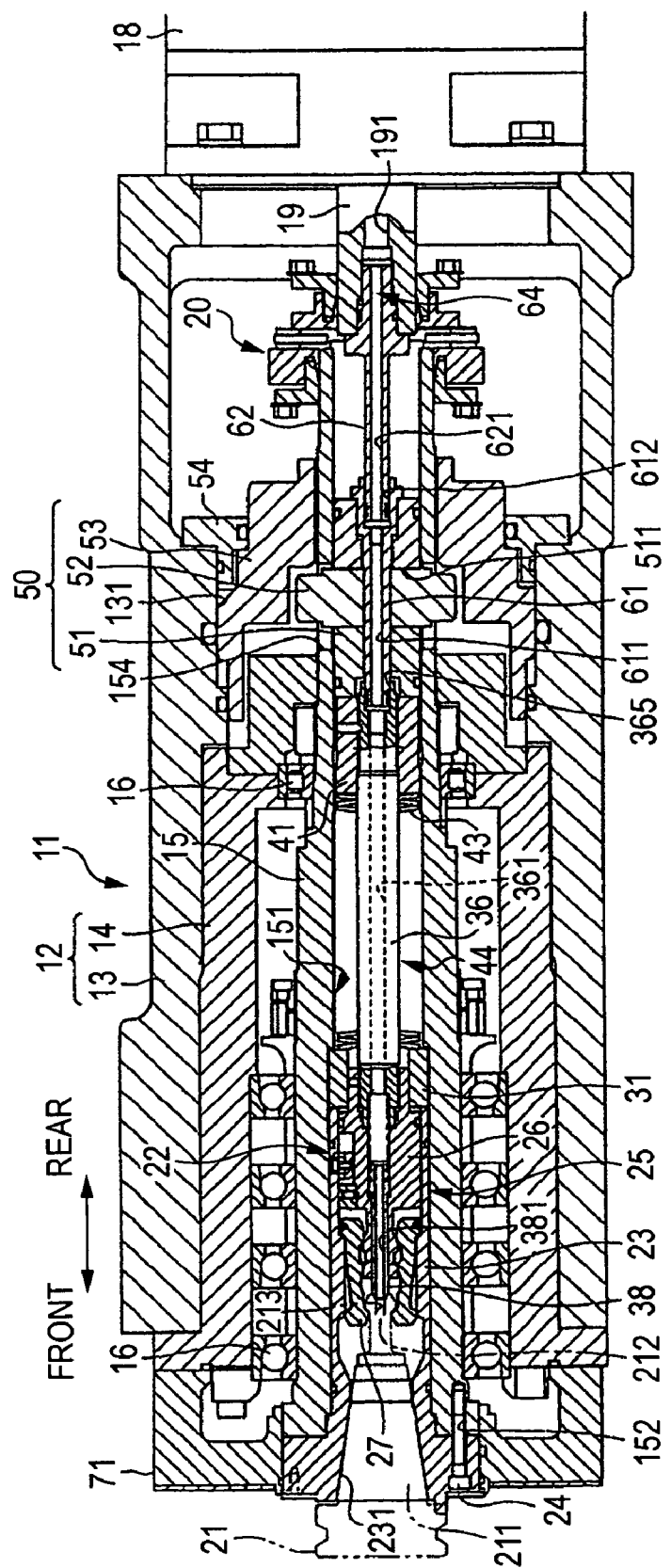
FIG. 1 is a vertical sectional view of a center portion showing a main spindle apparatus of a machine tool according to the present invention.

FIG. 1 is a vertical sectional view showing a total of a main spindle apparatus 11. As shown by FIG. 1, a main spindle head 12 of the main spindle apparatus 11 is constituted by an outer cylinder 13 and an inner cylinder 14. A main spindle 15 is rotatably supported on an inner side of the inner cylinder 14 at predetermined positions thereof via a plurality of bearings 16. A rear end portion of the outer cylinder 13 of the main spindle head 12 is attached with a motor 18, a rotating shaft 19 thereof is connected with a rear end portion of the main spindle 15 by a coupling 20. The main spindle 15 is rotated by rotating the rotating shaft 19 via the coupling 20.

Figure 2:
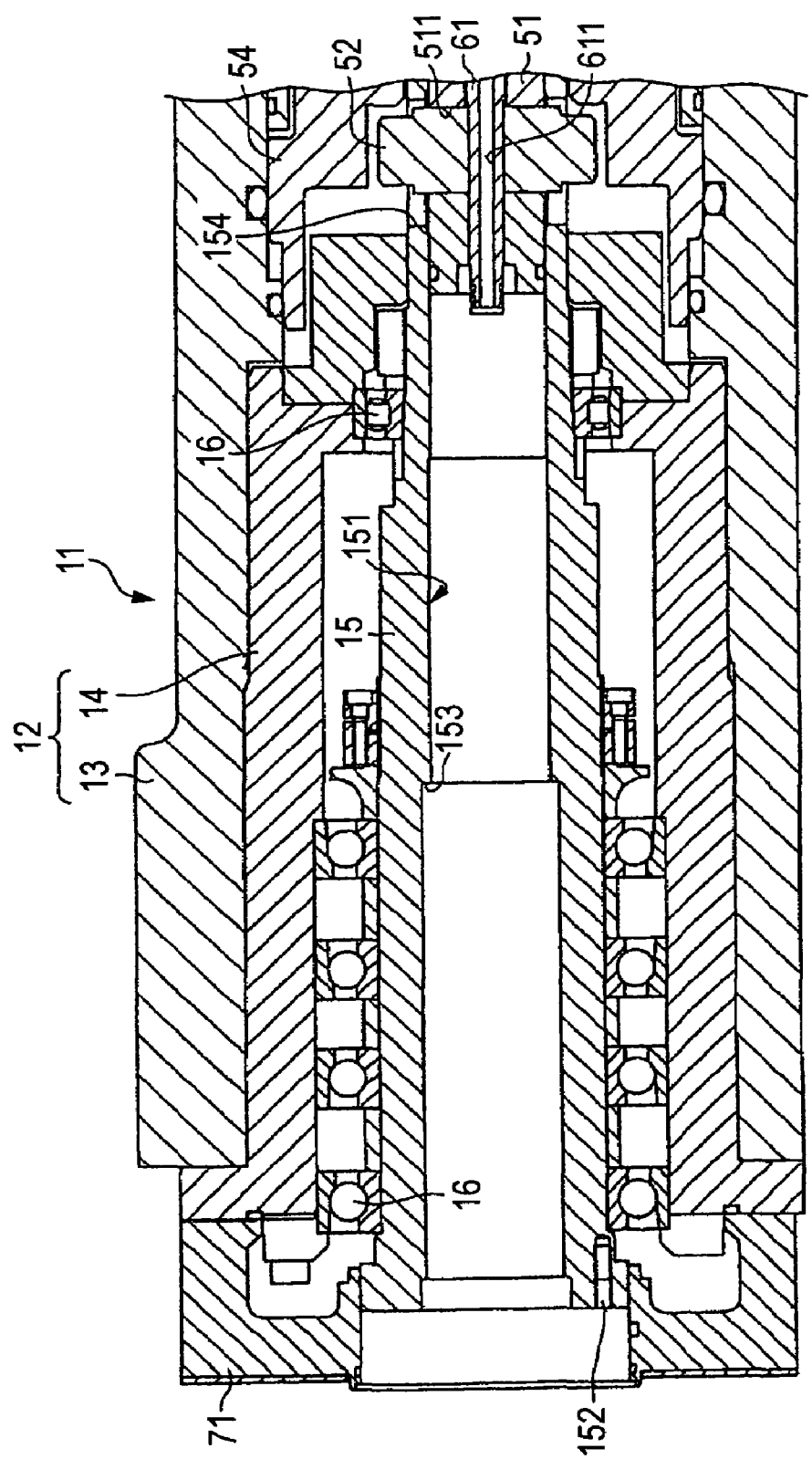
FIG. 2 is a vertical sectional view of the center portion showing the main spindle apparatus in a state of removing a tool holder clamp unit.

FIG. 2 is a vertical sectional view showing to enlarge the main spindle head 12 and the main spindle 15. As shown by FIG. 2, a center portion of the main spindle 15 is formed with a through hole 151 for removably mounting a tool holder clamp unit 22, which is explained later. A front end face of the main spindle 15 is formed with screw holes 152 for fixing the tool holder clamp unit 22 to the main spindle 15 at a plurality of locations. Diameter of the through hole 151, in which the tool holder clamp unit 22 of the main spindle 15 fits, is formed stepwisely reduced from front end (left side of FIG. 2) to rear end (right side of FIG. 2) as shown in FIG. 2.

Figure 3:
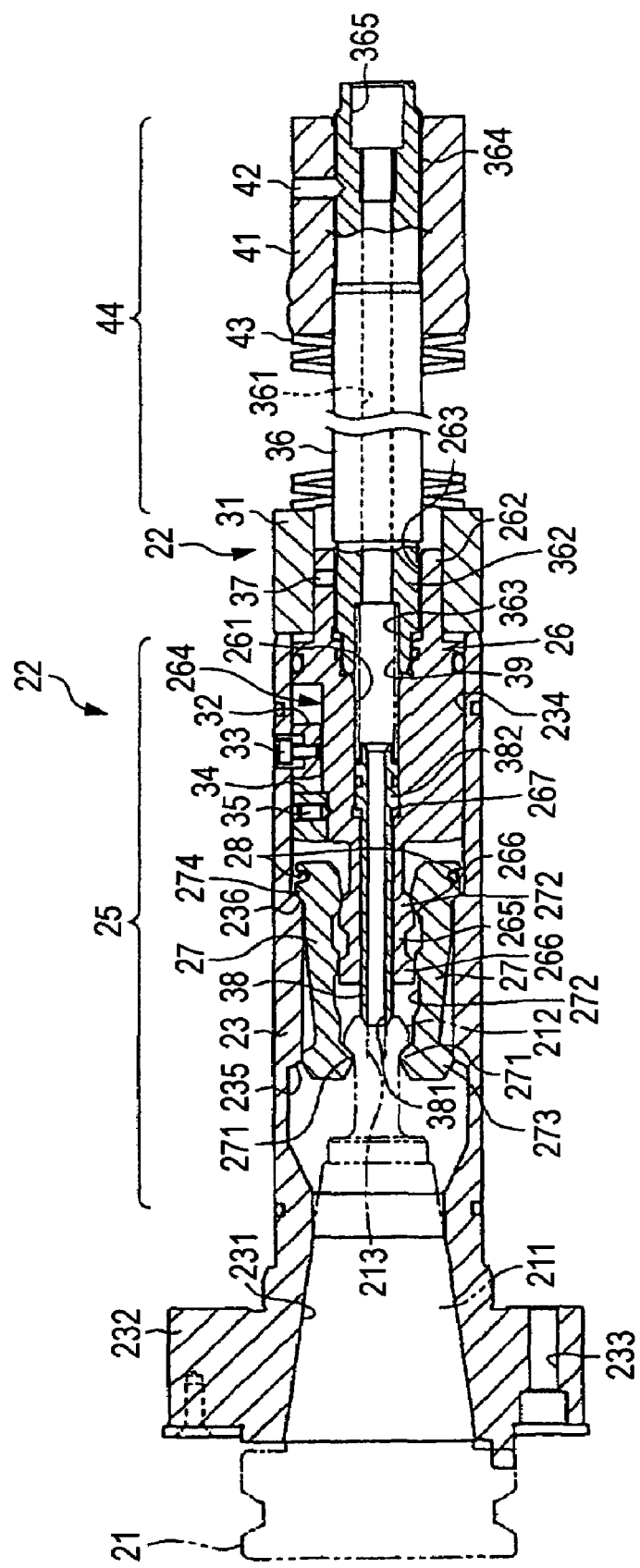
FIG. 3 is a vertical sectional view of the center portion showing a state of clamping the tool holder clamp unit.

FIG. 3 is a vertical sectional view of a center portion showing a total of the tool holder clamp unit 22 for holding a tool holder 21. The tool holder 21 is so called BT holder. A front end portion (left end of FIG. 3) of a unit main body 23 constituting a shape of a horizontal cylinder constituting the tool holder clamp unit 22 is formed with a tool mounting hole 231 for fitting a taper portion 211 of the tool holder 21. An outer periphery of the front end portion is integrally formed with a flange portion 232. The flange portion 232 is formed with bolt inserting holes 233 at a plurality of locations. The unit main body is fixed to the main spindle 15 by screwing a bolt 24 from the bolt inserting hole 233 to the screw hole 152 formed at the front face of the main spindle 15 as shown in FIG. 1.

An inner portion of the unit main body 23 is contained with a clamp mechanism 25. The clamp mechanism 25 clamps the tool holder 21, which is inserted to the tool mount hole 231 of the unit main body 23, in a predetermined position by engaging with a pull-stud portion 212 projectingly formed at tip end portion of a tapered shank portion 211, and dragging rearwardly. Explaining the clamp mechanism 25, a slider 26, which provides with coolant passage 261 at center of axle thereof, is reciprocatably inserted to an inner peripheral face 234 of a rear end portion of the unit main body 23 reciprocatably in an axial direction within a predetermined stroke range. A front end portion of the slider 26 is connected and fitted with clamp members 27, which is described later, as clamp members at a plurality of locations by a connecting spring 28 to be able to reciprocate, incline and pivot in a radius direction of the unit main body 23.

A spring receiving member 31 for determining a rear end position of the slider 26 and for supporting a disc spring 43, which is described after, is connected by welding etc. A boss member 262 is integrally formed at a rear end portion of the slider 26. A female screw 263 formed interior of the rear end portion is screwed to a male screw 362 formed at a front end portion of a drawing bar 36. A guide groove 264 is formed on an outer peripheral surface of the slider 26 so as to be parallel to the axial direction. On an inner peripheral surface 234 of the unit main body 23, a stopper 32 fitted in the guide groove 264 is attached to a predetermined position by a screw 33. A stopper 34 is attached to a tip end portion of the guide groove 264 by a screw 35. The slider 26 is permitted to move in an axial direction within the inner peripheral surface 234 of the unit main body 23, and restricted from being pivoted relative to the unit main body 23 by the guide groove 264 and the stopper 32. Further, the slider 26 and the drawing bar 36 are restricted from being pivoted relative to each other by a bolt 37.

Annular protrusions 266 are integrally formed on an outer peripheral surface of a small-diameter operating cylinder portion 265, which is integrally formed with a tip end portion of the slider 26, in a circumferential direction of the outer peripheral surface at front and rear portions with a predetermined interval. On the other hand, a clamp claw 271 is integrally formed on inner side of a tip end portion of the clamp member 27. Recessed portions 272 are formed on a middle portion of the clamp member 27 at two positions in accordance with the annular protrusions 266 of the slider 26. Further, a stepped portion 235 is formed on an inner peripheral surface 234 of the unit main body 23 in accordance with an engaging protrusion 273 formed on an outer peripheral surface of the clamp member 27, and a stepped portion 236 is formed on the inner peripheral surface 234 of the unit main body 23 in accordance with an engaging portion 274 formed on an outer-side rear end portion of the clamp member 27.

A coolant supply nozzle 38, which has coolant path 381, is inserted in a coolant passage 261 formed at a center portion of the slider 26 so as to reciprocate in an axial direction. A large diameter portion 382, which is formed integrally with an outer peripheral face of a base end portion of the coolant supply nozzle 38, is locked with a stepped portion 267 which is formed at an inner peripheral face of the slider 26. According to the constitution, the coolant supply nozzle 38 is prevented from being drawn to the front side in the axial direction. A coil spring 39 is interposed between a rear end face of the coolant supply nozzle 38 and an inner end face of a spring containing chamber 363 formed at a front end portion of the drawing bar 36 to bias the coolant supply nozzle 38 to the front side in a normal state. Therefore, a front end face of the coolant supply nozzle 38 is pressed to an opening of a rear end of a coolant path 213 formed at the tool holder 21, and a coolant is supplied to a center portion of the tool holder 21 from a coolant path 361 of the drawing bar 36 via the spring containing chamber 363 and the coolant path 381.

An outer peripheral face of a rear end portion of the drawing bar 36 is formed with a male screw portion 364, and the male screw portion 364 is screwed with a spring receiving member 41 and connected therewith so as not to be able to pivot relative to each other by a set of bolts 42. Disc springs 43 as an bias member are interposed between the spring receiving member 31 and the spring receiving member 41 in a horizontally laminated state. A rear end portion of the drawing bar 36 is formed with a fitting hole 365 having a diameter larger than that of the coolant path 361.

According to the embodiment, a bias mechanism 44 is constituted by the spring receiving member 31, the drawing bar 36, the spring receiving member 41 and the disc spring 43 and the like for biasing the clamp member 27 of the clamp mechanism 25 to a clamp state.

FIG. 3 shows a clamp state. The clamp state is obtained such that owing to the slider 26 being moved rearwardly by the disc spring 43, a clamp member 27 is moved rearwardly by an operating cylinder portion 265 and annular protrusion 266. and a tool holder 21 is dragged rearward by the clamp member 27 via a pull-stud portion 212. In the clamp state, an annular protrusion 266 of the slider is gotten out of a recessed portion 272 of the clamp member 27, rides on a protrusion of the clamp member 27 and simultaneously shifted to a closing direction. Further, a clamp claw 271 is engaged with a pull-stud portion of the tool holder 21, an engaging protrusion 273 rides on a stepped portion 235 and the engaging protrusion 273 is engaged with a stepped portion 236.

Figure 4:
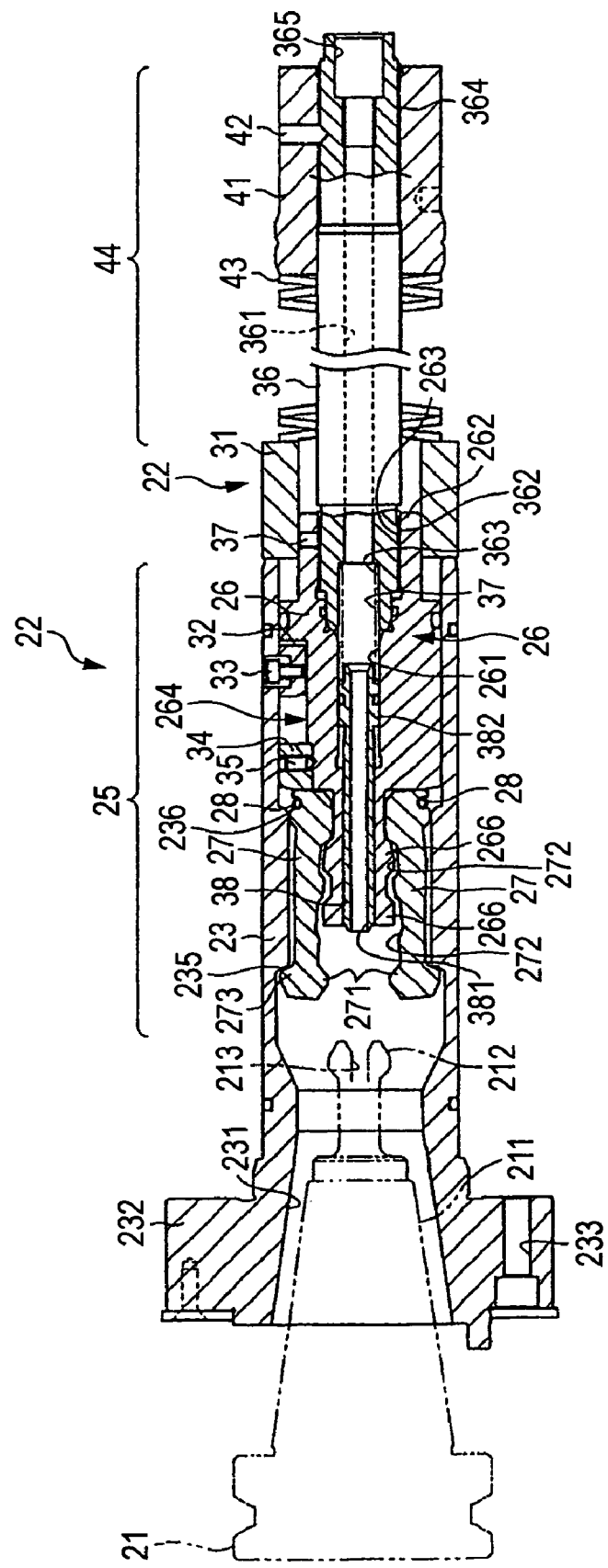
FIG. 4 is a vertical sectional view of the center portion showing a state of unclamping the tool holder clamp unit.

In the above-described state, when the drawing bar 36 is moved forwardly against the biasing force of the disc spring 43, the annular protrusion 266 of the slider 26 fit in the recessed portion 272 of the clamp member 27. Simultaneously a rear end face of the clamp member 27 is pressed by a front face of the large diameter portion of the slider 26, thus the clamp member 27 shift forward as shown in FIG. 4 and expands and shifted to a release position which release the clamp state of the tool holder 21.

Next, an explanation will be given of a clamp release mechanism 50 mounted to a side of the main spindle head 12 for releasing the clamp state of the clamp mechanism 25 by moving the drawing bar 36 of the tool holder clamp unit 22 to the front side.

As shown by FIG. 1, an operating member 51 is contained in the through hole 151 of the main spindle 15 reciprocatably the axial direction to be brought into contact with a rear end face of the spring receiving member 41. An operating pin 52 is penetrated to fix to a through hole 511 formed in radius direction of the operating member 51. A guide passage 154 is formed at two locations of the main spindle 15 such that both end portions of the operating pin 52 are projected to outer portions and the operating pin 52 is reciprocated within a predetermined stroke range. A piston 53 is contained between an inner peripheral face 131 of a rear end portion of the outer cylinder 13 and an outer peripheral face of the main spindle 15 in correspondence with the operating pin 52 reciprocatably within a predetermined stroke range. A position restricting ring 54 of the piston 53 is attached to a rear end portion of the outer cylinder 13.

Next, an explanation will be given of a coolant supply path for supplying the coolant from the side of the rotating shaft 19 to the opening of the rear end of the coolant path 361 of the drawing bar 36.

A coolant supply pipe 61 having a coolant path 611 is penetrated through and supported by center portions of the operating member 51 and the operating pin 52 in the axial direction. A front end portion of the coolant supply pipe 61 is fitted to the fitting hole 365 of the drawing bar 36 via a seal and a rear end portion is formed with a guide hole 612 having a diameter lager than that of the coolant path 611. A coolant supply pipe 62 having a coolant passage 621 is connected to a space defined between the guide hole 612 and a tip end portion of a coolant passage 191 formed at a tip end portion of the rotation shaft 19.

According to the embodiment, a coolant supply path 64 for supplying the coolant to the coolant path 213 of the tool holder 21 is constituted by the coolant paths 611, 621, 361, the spring containing chamber 363, the coolant path 381 and the like.

Further, as shown by FIG. 1, a head cover 71 is attached to a front end face of the main spindle head 12.

Next, with regard to the main spindle apparatus constituted as described above, operation thereof will be explained.

FIG. 1 shows a state in which the integrated tool holder clamp unit 22 shown in FIG. 3 is inserted into the through hole 151 of the main spindle 15, and the flange portion 232 of the unit main body 23 is screwed to the screw hole 152 of the front end face of the main spindle 15 to be attached to fix thereto by the bolt 24. Further, there is constituted a state in which the tool holder 21 mounted to the main spindle 15 is clamped by the clamp mechanism 25 in the tool holder clamp unit 22, the front end portion of the coolant supply pipe 61 is fitted and connected to the connecting hole 365 of the rear end portion of the drawing bar 36, and the rear end face of the spring receiving member 41 is brought into contact with the front end face of the operating member 51 of the clamp release mechanism 50. Further, the clamp mechanism 25 is maintained in the clamp state and the clamp release mechanism 50 is maintained in an unreleased state.

Under the state, when the main spindle 15 is rotated by the rotating shaft 19 of the motor 18 via the coupling 20, the tool holder clamp unit 22 and the tool holder 21 are rotated along with a tool to carry out operation of machining the work.

In machining the work, the coolant is supplied to the coolant path 213 of the tool holder 21 via the coolant supply path 64 to lubricate and cool the portion of machining the work.

When the work has been finished to machine and the tool holder 21 is released from being clamped by the clamp mechanism 25 of the tool holder clamp unit 22, the piston 53 of the clamp release mechanism 50 are moved to the front side in FIG. 1, the piston 53 is moved in the same direction and the operating member 51 and the operating pin 52 are moved to the front side by the piston 53. By moving the operating member 51 to the front side, the spring receiving member 41 on the side of the tool holder clamp unit 22 is moved to the front side, the drawing bar 36 is moved to the front side against the bias force of the disc spring 43, and the tool holder 21 is released from the state of being clamped by the clamp mechanism 25, as described above. Under the state, the tool holder 21 can be replaced to another tool holder 21 by an automatic tool interchanging apparatus of the machine tool, which is not illustrated.

Meanwhile, when the tool holder clamp unit 22 is subjected to maintenance, check or repair, the tool holder 21 is removed from the tool mounting hole 231 of the tool holder clamp unit 22. Under the state, the clamp mechanism 25 is brought into an empty clamping state, which is defined a state clamping nothing, by the disc spring 43. Under the state, the bolt 24 is removed. Further, by drawing the tool holder clamp unit 22 from the through hole 151 of the main spindle 15 to frontward from the main spindle, the tool holder clamp unit 22 under the state shown in FIG. 3 is removed to outside of the through hole 151 of the main spindle 15.

According to the main spindle apparatus of the embodiment, the following effects can be achieved.

According to the embodiment, as shown by FIG. 3, the spring receiving member 41 is fitted to fix to the rear end portion of the drawing bar 36 of the tool holder clamp unit 22, and the disc spring 43 for biasing the clamp mechanism 25 to the clamp state is interposed between the spring receiving member 31 and the spring receiving member 41. Further, all of the clamp mechanism 25 and the bias mechanism 44 are mounted to the side of the tool holder clamp unit 22. Therefore, the total of the tool holder clamp unit 22 can be mounted or removed from the through hole 151 of the main spindle 15 from the front side of the main spindle 15 or removed therefrom, the clamp mechanism 25 and the bias mechanism 44 can also be taken out integrally, maintenance, check or repair of the clamp mechanism 25 and the bias mechanism 44 can easily be carried out and operability of maintenance can be promoted. That is, as to exchange of the disc spring 43, it is not necessary to remove other parts from a rear side of the main spindle apparatus. It is possible to remove or mount the disc spring 43 to anywhere of the tool holder clamp unit 22 which is taken from the front side of the main spindle 15.

According to the embodiment, the clamp mechanism 25 and the bias mechanism 44 are mounted to the side of the tool holder clamp unit 22 to unitize and therefore, it is not necessary to form a stepped portion in a flange-like shape for locking one end of the disc spring 43 of the bias mechanism 44 at an inner peripheral face of the through hole 151 of the main spindle 15. Therefore, the diameter of the through hole 151 of the main spindle 15 can be stepwisely reduced from the front end to the rear end. Accordingly, operation of machining the through hole 151 of the main spindle 15 may be carried out to machine only from the front side in the axial direction of the main spindle 15 and efficiency of the machining operation can be promoted.

Next, another embodiment of the invention will be described with reference to FIGS. 5 and 6.

This embodiment is adapted for a tool holder 21 different in type from the tool holder 21 of the preceding embodiment, and differs from the preceding embodiment in that a tool mounting hole 231 and a clamp mechanism 25 of a tool holder clamp unit 22 are different in form from those of the preceding embodiment. The other construction is similar to that of the preceding embodiment, and therefore explanation thereof will be omitted.

Figure 5:
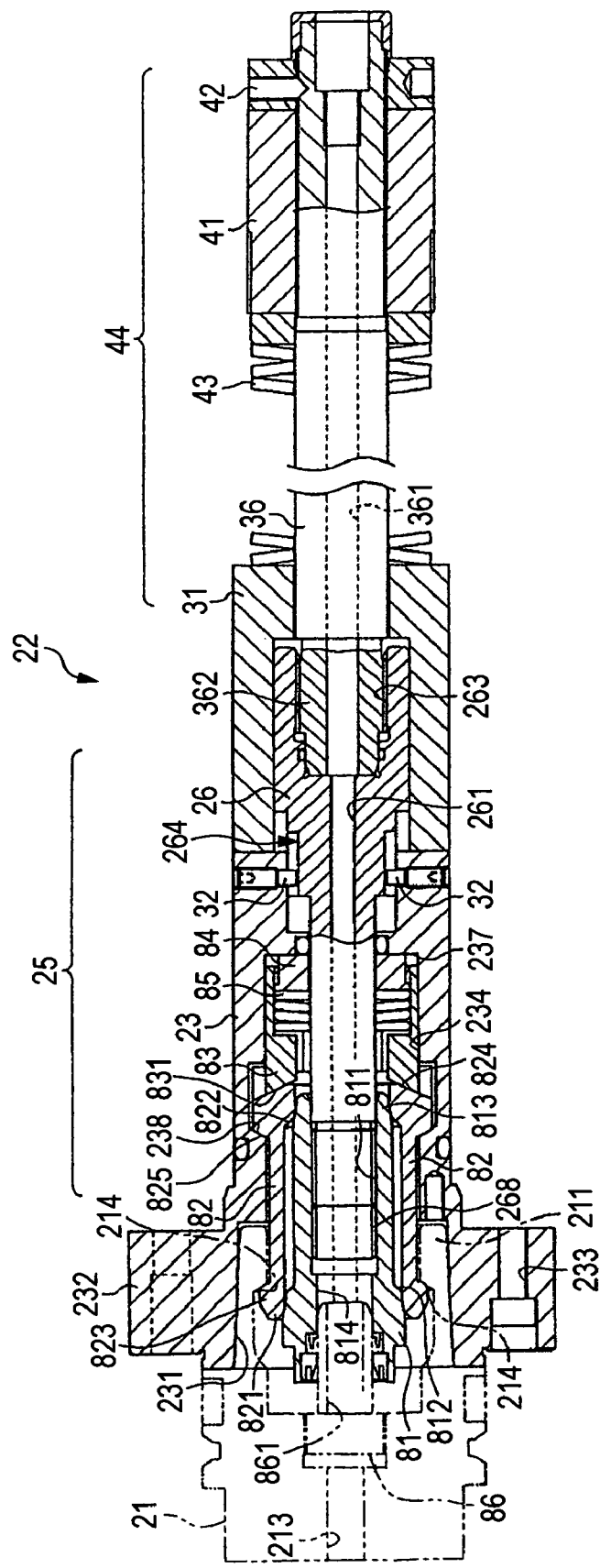
FIG. 5 is a vertical sectional view of the center portion showing a state of clamping the tool holder clamp unit according to another embodiment of the present invention.
Figure 6:
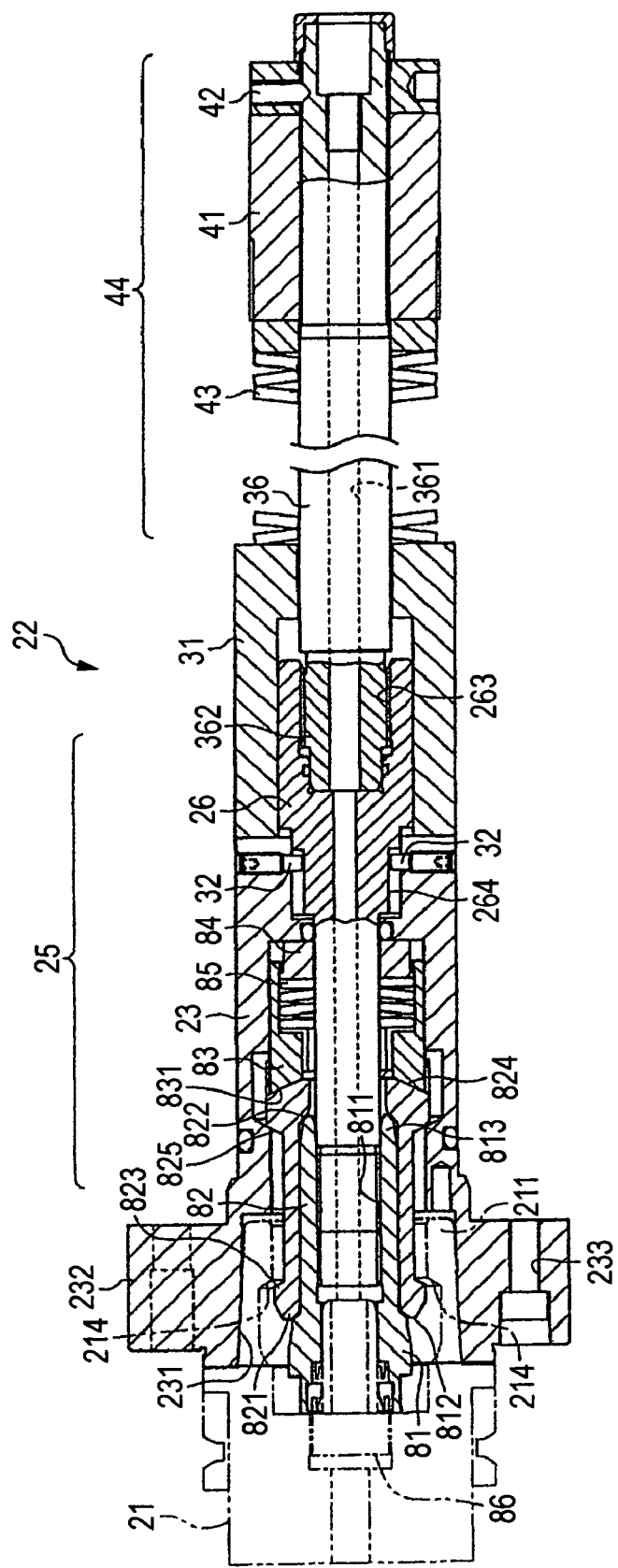
FIG. 6 is a vertical sectional view of the center portion showing a state of unclamping the tool holder clamp unit of FIG. 5.

The tool holder 21, used in this embodiment, is a so-called HSK holder, and its taper shank portion 211 has a cavity having an open rear end as indicated in dots-and-dash lines in FIGS. 5 and 6, and this tool holder is of such a two surface-restraining type that it is fixed in position by a tapering outer peripheral surface of the taper shank portion 211 and a rear end surface of a holder portion formed at a front end of the taper shank portion.

An externally-threaded portion 268, formed at a distal end portion of a slider 26, is threaded in a screw hole 811 defined by an inner peripheral surface of an operating tube 81 of a cylindrical shape. A plurality of clamp members 82 are held in contact with an outer peripheral surface of the operating tube 81, and a distal end edge 821 of each clamp member 82 is disposed in close proximity to a step portion 812, formed on the outer peripheral surface of the operating tube 81, so as to slide on this step portion 812. A rear end edge 813 of the operating tube 81 is disposed in close proximity to a step portion 822, formed on and projecting from an inner surface of each clamp member 82 at a rear end portion thereof, so as to slide on this step portion 822. A clamp claw 823 is formed on an outer surface of the clamp member 82 at a distal end thereof, and this clamp claw 823 can be retainingly engaged with a retaining step portion 214 formed on and projecting from the inner peripheral surface of the taper shank portion 211 of the tool holder 21. A slanting surface 824 is formed at the rear end of each clamp member 82, and a guide tube 83 is received within the unit main body 23 in facing relation to these slanting surfaces 824, and is reciprocally movable in an axial direction. A slanting guide surface 831, formed at a front end of the guide tube 83, is held in sliding contact with these slanting surfaces 824. A spring 85 is interposed between a spring receiving member 84 (which is retained by a step portion 237 formed on an inner peripheral surface 234 of the unit main body 23) and the guide tube 83. A slanting guide surface 825, formed on the outer surface of each clamp member 82, is held in sliding contact with a slanting guide surface 238 formed on the inner peripheral surface 234 of the unit main body 23.

An interconnecting tube 86, having a coolant passageway 861 communicating with a coolant passageway 213, is mounted in the tool holder 21, and when the tool holder 21 is mounted on a spindle 15, a distal end portion of this interconnecting tube 86 is fitted into a coolant passageway 814 (formed through the operating tube 81 at the center thereof) through a seal, and therefore is connected thereto so as to supply a coolant.

Next, the operation for releasing the clamping of the tool holder 21 will be described.

FIG. 5 shows a clamped condition of the tool holder 21, in which the slider 26, a drawing bar 36 and the operating tube 81 are moved rearward (right in FIG. 5) by disc springs 43, and the distal end edges 821 of the clamp members 82 slide on the step portion 812 of the operating tube 81, and the rear end edge 813 of the operating tube 81 slides on the step portions 822 of the clamp members 82, so that the clamp members 82 are moved radially outwardly of the operating tube 81, and the clamp claws 823 are retainingly engaged with the retaining step portion 214 of the tool holder 21, and draw the tool holder 21, so that the rear end surface of the holder portion is held in intimate contact with the front end surface of the unit main body 23. In this condition, the slanting guide surface 831 of the guide tube 83 is moved rearward by the slanting guide surfaces 824 of the clamp members 82, so that the spring 85 is held in a compressed condition.

In this condition, when the drawing bar 36 and the spring receiving member 41 are moved forward relative to the unit main body 23 and the spring receiving member 31, the operating tube 81, connected to the distal end portion of the slider 26, is moved forward as shown in FIG. 6, and the step portion 812 of the operating tube 81 is moved forward in a direction away from the distal end edges 821 of the clamp members 82, and the guide tube 83 is moved forward by the spring 85, and the slanting surfaces 824 of the clamp members 82 are pressed by the slanting guide surface 831, so that the clamp members 82 are moved radially inwardly of the operating tube 81. Therefore, the rear end edge 813 of the operating tube 81 is moved in a direction away from the step portion 822, so that the clamping of the tool holder 21 by the clamp members 82 is canceled as shown in FIG. 6.

The operation for clamping the tool holder 21 is carried out according to a procedure reverse to the procedure of the release operation.

In the above embodiment, similar advantages to those of the preceding embodiment can also be achieved.

Next, a further embodiment of the invention will be described with reference to FIGS. 7 and 8.

This embodiment is adapted for a tool holder 21 different in type from the tool holders 21 of the above two embodiments, and differs from the above embodiments in that a tool mounting hole 231 and a clamp mechanism 25 of a tool holder clamp unit 22 are different in form from those of the above embodiments. The other construction is similar to that of the above embodiments, and therefore explanation thereof will be omitted.

Figure 7:
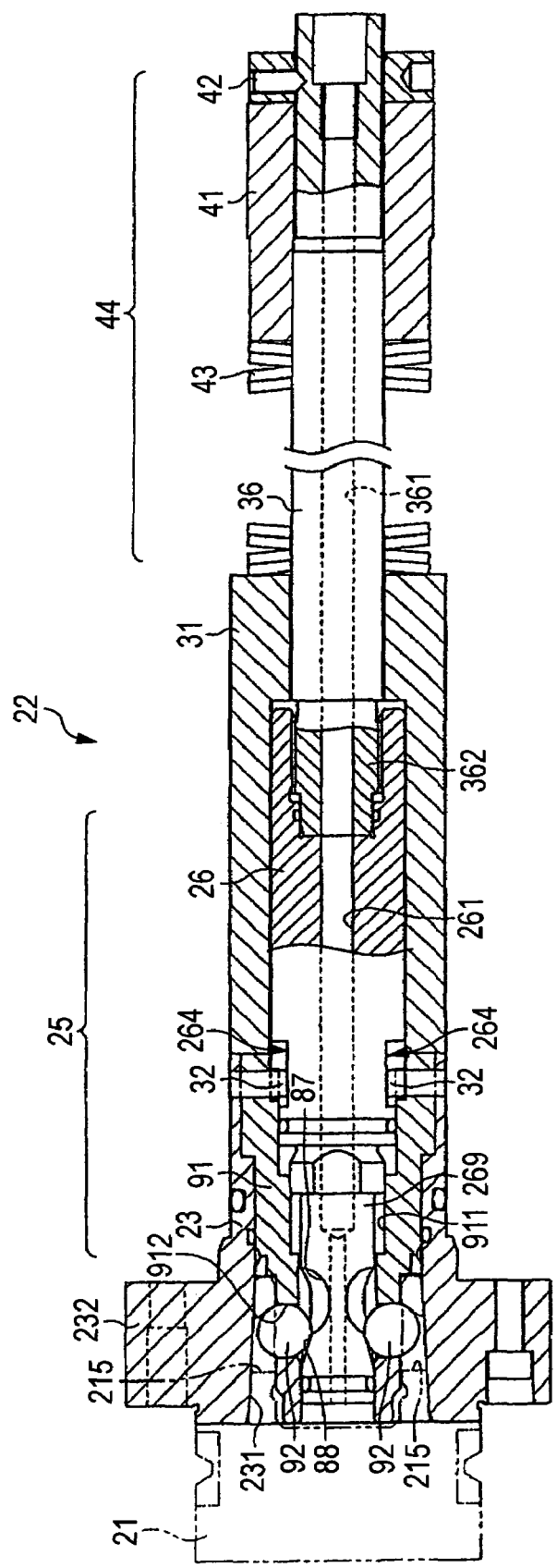
FIG. 7 is a vertical sectional view of the center portion showing a state of clamping the tool holder clamp unit according to the other embodiment of the present invention.
Figure 8:
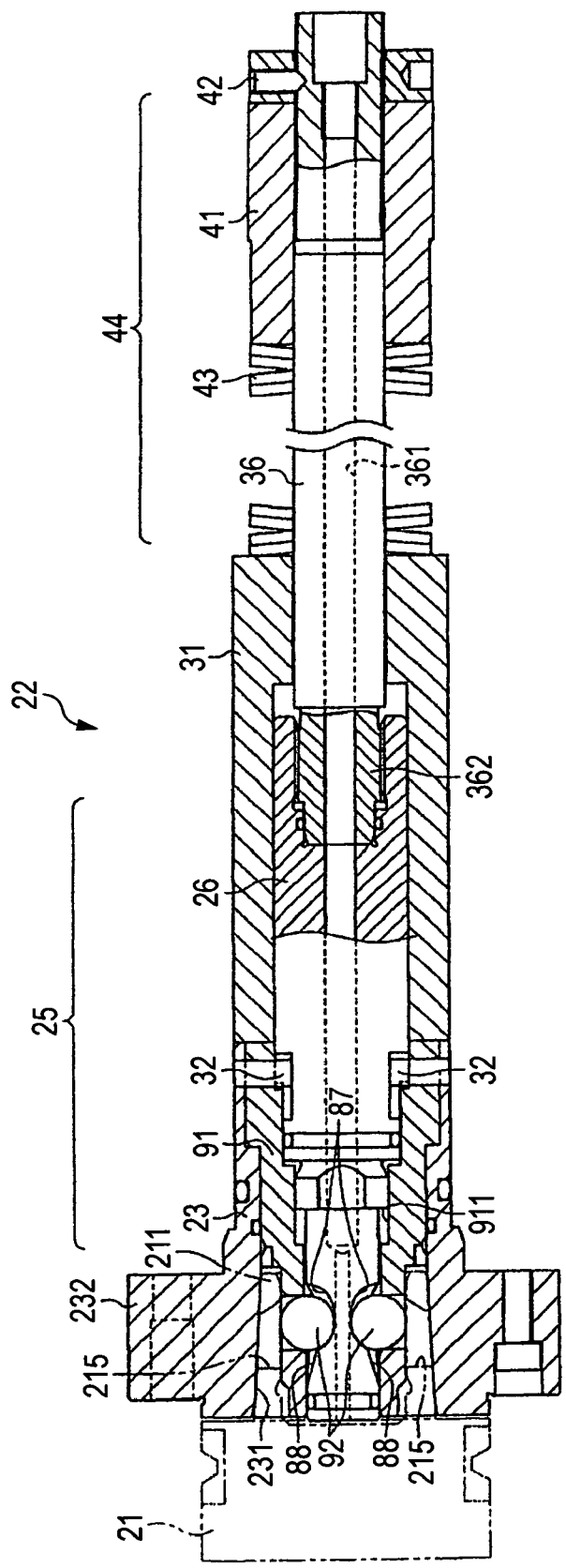
FIG. 8 is a vertical sectional view of the center portion showing a state of unclamping the tool holder clamp unit of FIG. 7.

The tool holder 21, used in this embodiment, is a so-called KM holder, and its taper shank portion 211 has a cavity having an open rear end as indicated in dots-and-dash lines in FIGS. 7 and 8, and this tool holder is of such a two surface-restraining type that it is fixed in position by a tapering outer peripheral surface of the taper shank portion 211 and a rear end surface of a holder portion formed at a front end of the taper shank portion. Two retaining holes 215, spaced from each other in a circumferential direction, are formed in an inner peripheral surface of the taper shank portion 211, and extend through the taper shank portion 211 to the outer peripheral surface thereof.

As shown in FIG. 7, an operating portion 269 is formed integrally at a distal end of a slider 26, and engagement recesses 87 (in which balls 92 can be engaged, respectively) are formed in an outer peripheral surface of this operating portion, and a slanting guide surface 88 is formed on this outer peripheral surface, and is disposed forwardly of the engagement recesses 87 in immediately adjacent relation thereto, and extends to these engagement recesses 87. A ball holder 91, having a through hole 911, is fitted in an inner peripheral surface of a unit main body 23, and is fixed thereto in a predetermined position. Two retaining holes 912 for respectively retaining the balls 92 are formed in a distal end portion of the ball holder 91. The balls 92 can be fitted respectively in the retaining holes 215 in the tool holder 21.

Next, the operation for releasing the clamping of the tool holder 21 will be described.

FIG. 7 shows a clamped condition of the tool holder 21, in which a drawing bar 36 and a spring receiving member 41 are moved rearward by disc springs 43, and the slider 26 and the operating portion 269 thereof are moved rearward, and the balls 92, while held in the respective retaining holes 912, are moved radially outwardly of the ball holder 91 through the slanting guide surface 88 of the operating portion 269, and the balls 92 are also fitted respectively in the retaining holes 215, and the tool holder 21 is drawn through the balls 92, so that the rear end surface of the holder portion is held in intimate contact with the front end surface of the unit main body 23. In this condition, when the drawing bar 36 and a spring receiving member 41 are moved forward relative to the unit main body 23 and a spring receiving member 31 against the bias of the disc springs 43, the slider 26 and the operating portion 269 thereof are moved forward as shown in FIG. 8, and the slanting guide surface 88 of the operating portion 269 is moved forward, so that the engagement recesses 87 are brought into registry with the balls 92, respectively, and each ball 92 is guided from the retaining hole 215 to the retaining hole 912, and is fitted into the engagement recess 87, so that the clamped condition of the tool holder 21 is released as shown in FIG. 8.

The operation for clamping the tool holder 21 is carried out according to a procedure reverse to the procedure of the clamp release operation.

The tool holder clamp unit 22 of this embodiment also achieves similar advantages to those attained by the tool holder clamp unit 22 of the above embodiment of FIG. 1.

In the spindle apparatus of FIG. 1, when the clamp type is changed as shown in FIG. 5 or FIG. 7, it is only necessary to exchange the tool holder 21, and the other parts can be used as common parts. When manufacturing machine tools having different clamp specifications, the parts other than the tool holder clamp unit 22 can be used as common parts, and therefore the manufacturing cost can be reduced.

Further, the above-described embodiment may be modified as follows.

In place of the disc spring 43, a coil spring or other bias member may be used.

The constitution of the clamp mechanism 25 may pertinently be modified.

The constitution of the bias mechanism 44 may pertinently be modified.

The coolant supply path 64 may be omitted.

The invention may be embodied as a tool holder clamp unit used for a main spindle apparatus constituted by a unit main body in a cylindrical shape used for the main spindle apparatus and mounted to a through hole of a main spindle removably from a front side of the main spindle, a clamp mechanism provided at an inner portion of the unit main body for clamping a tool holder, and an bias mechanism provided at a rear end portion of the unit main body for biasing the clamp mechanism always to a clamp position.

Note that the front side is a side which the tool holder is provided (left direction of the figures), and the rear side is a side which the motor is provided (right direction of the figures).

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A main spindle apparatus, comprising:
   a main spindle having a through hole in an axial direction thereof;
   a main spindle head rotatably supporting the main spindle therein;
   a tool holder clamp unit including:
      a unit main body having a tool mounting hole to which a tool holder is mounted;
      a clamp mechanism for clamping the tool holder; and
      a bias mechanism for biasing the clamp mechanism in a clamping state; and
      a clamp release mechanism provided on the main spindle head side, the clamp release mechanism releasing the clamping state of the clamp mechanism by operating the bias mechanism,
      wherein the tool holder clamp unit is mounted in the through hole of the main spindle so that the tool holder clamp unit is removable from a front side of the through hole of the main spindle,
      wherein a single step is provided inside the main spindle so as to define a small diameter portion positioned on a rear side of the main spindle and a large diameter portion positioned the front side of the main spindle,
      wherein the bias mechanism is positioned at the small diameter portion when the tool holder clamp unit is mounted in the through hole of the main spindle, and
      wherein the large diameter portion houses the unit main body and the clamp mechanism.

2. The main spindle apparatus according to claim 1, wherein the unit main body of the tool holder clamp unit is substantially tube shaped,
   the clamp mechanism is provided interior of the unit main body, and
   the biasing mechanism is provided at a rear end of the unit main body.

3. The main spindle apparatus according to claim 2, wherein the clamp mechanism comprises:
   a slider provided in the unit main body, the slider reciprocally slides within a predetermined stroke range in an axial direction; and
   a plurality of clamp members connected on a front end portion of the slider,
   wherein the bias mechanism comprises:
   a drawing bar connected to a rear end portion of the slider;
   a first spring receiving member provided at a rear end portion of the drawing bar;
   a second spring receiving member provided at a rear end portion of the unit main body, and
   a bias member provided between the first spring receiving member and the second spring receiving member, the bias member biasing the drawing bar to a clamp position.

4. The main spindle apparatus according to claim 3, wherein radially center portions of the clamp mechanism and the drawing bar are formed with coolant paths for supplying a coolant to a center portion of the tool holder.

5. The main spindle apparatus according to claim 3, wherein the clamp release mechanism comprises:
   an operating member provided in the through hole of the main spindle so as to contact with a rear end portion of the first spring receiving member and so as to reciprocate in the axial direction, the operating member having protrusion which protrudes in a radial direction; and
   a piston reciprocating in the axial direction so as to contact with the protrusion of the operating member,
   wherein the piston presses the protrusion forwardly in order to release the clamp state of the tool holder.

6. The main spindle apparatus according to claim 3, wherein the bias mechanism biases the drawing bar rearwardly in order to set the clamp mechanism in the clamp state.

7. The main spindle apparatus according to claim 1, wherein the front end portion of the unit main body is integrally formed with a flange portion, and
   the flange portion is attached to a front end face of the main spindle by a bolt.

8. The main spindle apparatus according to claim 1, wherein the bias mechanism includes a disc spring or a coil spring.

9. The main spindle apparatus according to claim 1, wherein the through hole of the main spindle is formed such that diameter of the through hole is stepwisely reduced from a front end of the main spindle apparatus to a rear end of the spindle apparatus.

10. The main spindle apparatus according to claim 1, wherein the apparatus is operable to remove the total of the tool holder clamp unit from the front side of the main spindle without removing any mechanism from a rear portion of the tool holder clamp unit, and
    wherein the clamp mechanism and the bias mechanism are also be taken out integrally.

11. The main spindle apparatus according to claim 1, wherein the tool holder is disposed on the front side of main spindle.

12. The main spindle apparatus according to claim 1, wherein the bias mechanism is provided so as to be exposed outside after the tool holder clamp unit is removed.

13. A main spindle apparatus, comprising:
    a main spindle having a through hole in an axial direction thereof;

a main spindle head rotatably supporting the main spindle within the main spindle head;

a tool holder clamp unit within the main spindle and comprising:
- a unit main body having a tool mounting hole to which a tool holder is mounted;
- a clamp mechanism for clamping the tool holder; and
- a force actuator that biases the clamp mechanism in a clamping state; and
- a clamp release mechanism provided in the main spindle and that releases the clamping state of the clamp mechanism by operating the force actuator, wherein the tool holder clamp unit is mounted in the through hole of the main spindle so that the tool holder clamp unit is removable from a front side of the through hole of the main spindle, wherein a single step is provided inside the main spindle so as to define a small diameter portion positioned on a rear side of the main spindle and a large diameter portion positioned on a front side of the main spindle, wherein the bias mechanism is positioned at the small diameter portion when the tool holder clamp unit is mounted in the through hole of the main spindle, and wherein the large diameter portion houses the unit main body and the clamp mechanism.

14. The main spindle apparatus according to claim 13, wherein the force actuator comprises a spring.

15. The main spindle apparatus according to claim 13, wherein the tool holder is disposed on the front side of main spindle.

16. The main spindle apparatus according to claim 13, wherein the tool holder clamp unit is mounted in the through hole of the main spindle so that the tool holder clamp unit is removable from a front side of the through hole of the main spindle without accessing the tool holder clamp unit from the rear side of the main spindle.

17. The main spindle apparatus according to claim 13, wherein the force actuator is provided so as to be exposed outside after the tool holder clamp unit is removed.

* * * * *